United States Patent
Chuah

(10) Patent No.: US 6,654,808 B1
(45) Date of Patent: Nov. 25, 2003

(54) PROVING QUALITY OF SERVICE IN LAYER TWO TUNNELING PROTOCOL NETWORKS

(75) Inventor: Mooi Choo Chuah, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/285,817

(22) Filed: Apr. 2, 1999

(51) Int. Cl.[7] ............................................... G06F 15/16
(52) U.S. Cl. ....................................... 709/227; 709/228
(58) Field of Search ................................. 709/230, 240, 709/246, 220, 228; 370/411, 412, 395

(56) References Cited

U.S. PATENT DOCUMENTS

| | | | | |
|---|---|---|---|---|
| 5,674,003 A | * | 10/1997 | Andersen et al. | 348/14.08 |
| 5,917,822 A | * | 6/1999 | Lyles et al. | 370/395.4 |
| 5,940,390 A | * | 8/1999 | Berl et al. | 370/389 |
| 6,094,437 A | * | 7/2000 | Loehndorf, Jr. et al. | 370/420 |
| 6,137,791 A | * | 10/2000 | Frid et al. | 370/331 |
| 6,154,778 A | * | 11/2000 | Koistinen et al. | 370/230 |
| 6,157,955 A | * | 12/2000 | Narad et al. | 709/228 |
| 6,167,028 A | * | 12/2000 | Harris | 340/825.5 |
| 6,223,028 B1 | * | 4/2001 | Chang et al. | 455/403 |
| 6,223,222 B1 | * | 4/2001 | Fijolek et al. | 370/236 |
| 6,339,595 B1 | * | 1/2002 | Rekhter et al. | 370/392 |

FOREIGN PATENT DOCUMENTS

| | | | | |
|---|---|---|---|---|
| WO | WO 9845966 | * | 8/1994 | H04B/7/26 |
| WO | WO 9507578 | * | 8/1997 | H04B/7/24 |

OTHER PUBLICATIONS

Jain, Mobile Internet Access and QOS Guarantees Using IP and RSVP with Location Registers, ICC '98.*

K. Hamzeh, T. Kolar, M. Littlewood, G. Singh Pall, J. Taarud, A. J. Valencia, W. Verthein, W. M. Towsley, B. Palter, A. Rubens, "Layer Two Tunneling Protocol (L2TP)", Internet Draft, Oct. 1997.

V. Jacobson, et al., "An Expedited Forwarding PHB", draft–ietf–diffserv–phb–ef–01.txt, Nov. 1998.

S. Blake, et al., "An Architecture for Differentiated Services", RFC2475, Dec. 1998.

J. Heinanen, et al., "Assured Forwarding PHB Group", draft–ietf–diffserv–af–03.txt, Dec. 1998.

S. Shenker, et al., "Specification of Guaranteed Quality of Service", rfc2212.txt, Sep. 1997.

P. Calhoun, "Layer Two Tunneling Protocol 'L2TP' IP Differential Services Extension", Internet Draft, Jul. 1998 draft–ietf–pppext–12tp–ds–02.txt @ http://www.ietf.org.

C. Bormann, "The Multi–class Extension to Multilink PPP," IETF draft Aug. 1998.

C. Bormann, "PPP in a real–time oriented HDLC–like framing," IETF draft, Aug. 1998.

K. Slower et al., "The PPP Multilink Protocol (MP)", RFC1990, Aug. 1996.

C. Perkins et al., "IP Mobility support," RFC2002, Oct. 1996.

S. Blake et al., "An architecture for differentiated services," RFC2475 Dec. 1998.

C. Perkins, "IP encapsulationin IP", RFC2003, Oct. 1996.

* cited by examiner

*Primary Examiner*—Marc D. Thompson

(57) ABSTRACT

New Attribute Value Pairs (AVP)s are defined for use in the L2TP control messages for setting up a call. In particular, an L2TP Incoming-Call-Request (ICRQ) or Outgoing-Call-Request (OCRQ) message includes a QoS_Request AVP, which includes a field for defining the number of classes of service within the call. In another embodiment, a new QoS_Request extension and a new QoS_Reply extension are defined for use in Mobile IP networks.

21 Claims, 14 Drawing Sheets

Modification to a Multilink header

Modification to a Multilink header

PROVING QUALITY OF SERVICE IN LAYER TWO TUNNELING PROTOCOL NETWORKS

CROSS-REFERENCE TO RELATED APPLICATIONS

Related subject matter is disclosed in the commonly assigned, U.S. patent application of Chuah, entitled "Providing Quality of Service in Layer Two Tunneling Protocol Networks," Ser. No. 09/259,900, filed on Feb. 26, 1999, now abandoned.

FIELD OF THE INVENTION

This invention relates generally to communications and, more particularly, to packet communications systems.

BACKGROUND OF THE INVENTION

In the past, all data traffic using the Internet was treated equally and transported using a "best effort" mechanism. However, over time, the need to support real-time applications over the Internet (e.g., audio/video conferencing tools, gaming applications, etc.) necessitated some form of differentiated services offering. As such, those in the art are defining new protocols for providing quality of service (QoS) to Internet users. (QoS is also referred to as Type of Service (ToS).) For example, the article "An Architecture for Differentiated Services," RFC2475, December 1998 by S. Blake, et al., defines six bits within the TOS byte in the Internet Protocol (IP) header for conveying a code point which represents a certain QoS. Similarly, the article "An Expedited Forwarding PHB", draft-ietf-diffserv-phb-ef-01.txt, November 1998, by V. Jacobson, et al., describes one specific code point that allows users to subscribe to different configured rates just like the Constant Bit Rate (CBR) service in ATM. The article "Assured Forwarding PHB Group", draft-ietf-diffserv-af-03.txt, December 1998, by J. Heinanen, et al. describes other types of services that are similar to Real Time/Non Real-Time Variable Bit Rate (VBR) services in ATM. And, the article "PPP in a real-time oriented HDLC-like framing," by C. Bormann, WETF draft August 1998, proposes a suspend/resume-oriented solution for providing integrated services over low-bitrate links. (PPP stands for Point-to-Point Protocol.) This proposal builds from the PPP multilink fragmentation protocol (e.g., see K. Slower etc "The PPP Multilink Protocol (MP)," RFC1990, August 1996) and its multi-class extension (e.g., see C. Bormann, "The Multi-class Extension to Multilink PPP," IETF draft August 1998).

One use of the Internet as a communications vehicle is as an enhanced data back-bone for coupling together different sites to provide what is referred to as a "virtual private network" (VPN). One application of a VPN is in a corporate environment such that employees, e.g., at home, can remotely access, via the Internet, corporate data networks. A VPN provides security, and authentication, for a remote user to join a closed user group notwithstanding the use of public facilities. In effect, the use of a VPN provides a WAN-like vehicle to the corporation and its employees. (Although the corporate network could also provide direct remote access, e.g., a user dials directly into the corporate network, there are economic advantages to the use of a VPN.)

To provide a VPN, tunneling protocols are used such as the "Point-to-Point Tunneling protocol" (PPTP) and the "Layer 2 Forwarding" (L2F) protocol. Generally speaking, a tunnel protocol enables the creation of a private data stream via a public network by placing one packet inside of another. In the context of a VPN, an IP packet is placed inside another IP packet (IP-in-IP). In an attempt to develop an industry standard, the Internet Engineering Task Force (IETF) is developing the "Layer 2 Tunneling Protocol" (L2TP), which is a hybrid of the PPTP and L2F protocols (e.g., see K. Hamzeh, T. Kolar, M. Littlewood, G. Singh Pall, J.Taarud, A. J. Valencia, W. Verthein; Layer Two Tunneling Protocol "L2TP"; Internet draft, March, 1998).

For a remote user, a typical form of access to a VPN is via a "plain-old-telephone service" (POTS) connection to an "Internet service provider" (ISP) that provides the VPN service. For example, a user incorporates an analog modem into a personal computer, or equivalent, and has a customer account with a particular ISP, referred to herein as the "home" ISP. (It is also assumed that the user's personal computer is properly configured to support one of the above-mentioned tunneling protocols.) The user accesses the VPN by simply making a data call to the home ISP, e.g., dialing a telephone number associated with the "home" ISP and then "logging in" to the VPN.

As noted above, in L2TP, a tunnel is established between two VPN service providers for carrying a number of calls. Unfortunately, the above-mentioned L2TP protocol does not address "Quality of Service" (QoS) issues (also know as Differential Services). As such, some users may be reluctant to adopt L2TP without QoS assurances such as a guaranteed minimum bandwidth for a call. Consequently, those in the art have suggested modifying L2TP such that after a tunnel is established, a per-call QoS can be negotiated using only a single code point value (e.g., see "Layer Two Tunneling Protocol 'L2TP' IP Differential Services Extension," July 1998, draft-ietf-pppext-l2tp-ds-02.txt [@http://www.ietf.org)].

SUMMARY OF THE INVENTION

Unfortunately, providing a per-call QoS using a single code point value is not a complete solution to the problem in an L2TP-based system. In particular, I have realized that the above-mentioned *PPP Multilink Protocol (MP)* and, its multi-class extension should also be supported in an L2TP environment. Therefore, and in accordance with the invention, the control signaling in L2TP is modified to support multiple classes of service within a call.

In an embodiment of the invention, new Attribute Value Pairs (AVP)s are defined for use in the L2TP control messages for setting up a call (as defined in L2TP, AVPs are used to further specify control signaling). In particular, an L2TP Incoming-Call-Request (ICRQ) or Outgoing-Call-Request (OCRQ) message includes a QoS Request AVP, which includes a field for defining the number of classes of service, or QoS, within the call. One QoS for each PPP multi-class extension.

In another embodiment of the invention, a new QoS_Request extension and a new QoS_Reply extension are defined for use in Mobile IP networks.

DETAILED DESCRIPTION

Figure 1:
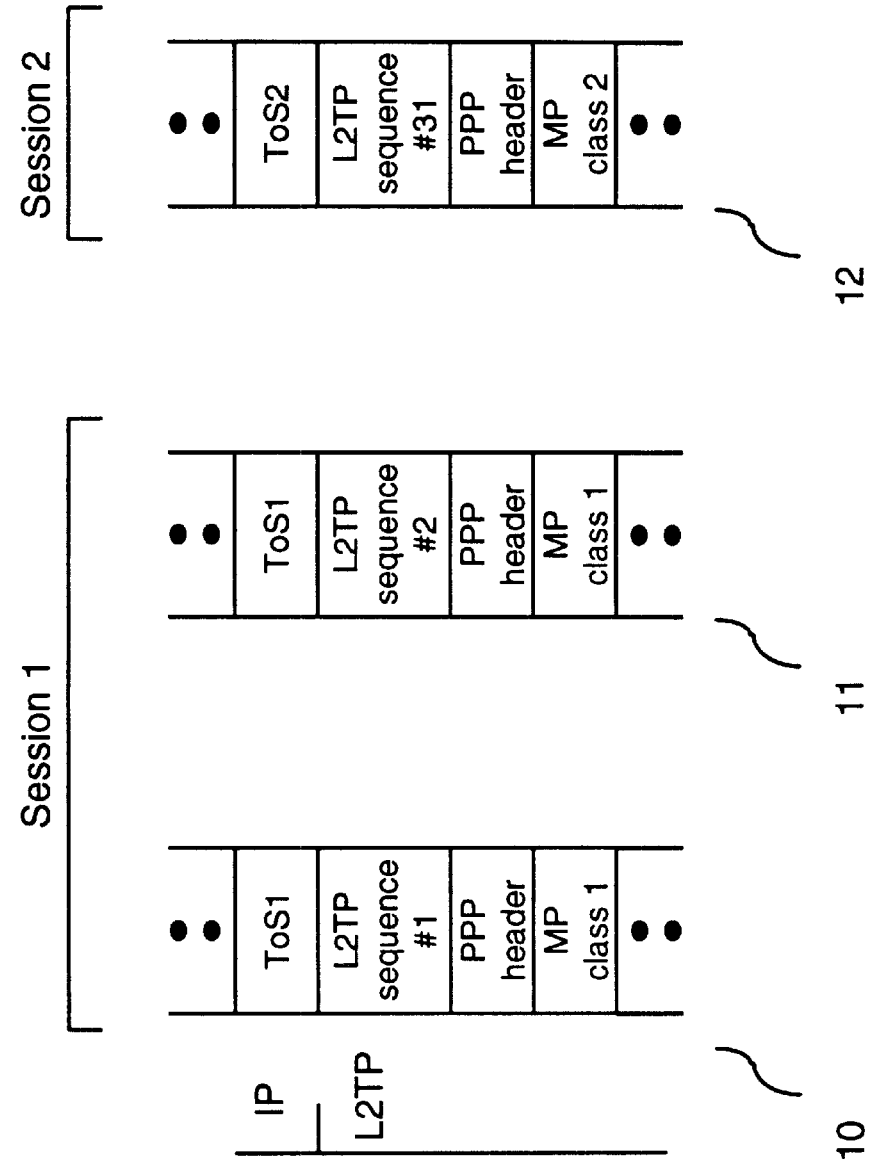
FIG. 1 shows portions of L2TP packets with encapsulated MP packets as known in the prior art.

Before describing the inventive concept, an illustration of prior art MP transmission is described via FIG. 1, which shows portions of L2TP packets with encapsulated MP packets. (It should be noted that this figure, and subsequent similar figures, show summaries of the relevant information conveyed in the packets and do not represent all of the fields in the packets.) L2TP packet 10 has a defined quality-of-service field as represented by ToS1 (the more common reference within IP is the Type-of-Service field). This field is followed by an L2TP sequence number field, illustratively set to 1. The L2TP sequence number field is followed by a PPP header field and an MP class field, which illustratively indicates this packet as having class 1. As known in the art, L2TP control messages and different L2TP data sessions use different sequence number spaces, or sets of sequence numbers. In particular, L2TP currently requires a different sequence number space, or set of sequence numbers, for each transmitted PPP packet of a particular class or link. This is illustrated by L2TP packets 11 and 12 which are part of session 1. L2TP packet 11, which conveys the next class 1 packet, uses the same sequence number set as L2TP packet 10 and the value for this field is simply the next number in the sequence (or in the sequence number set), i.e., 2. However, when a different class of PPP data is encountered, i.e., a different L2TP data session and hence a different sequence numbering space, or sequence number set, is used. This is illustrated by L2TP packet 12 of session 2, which conveys PPP data having an MP class 2 and using an entirely different sequence numbering, e.g., 31.

Figure 2:
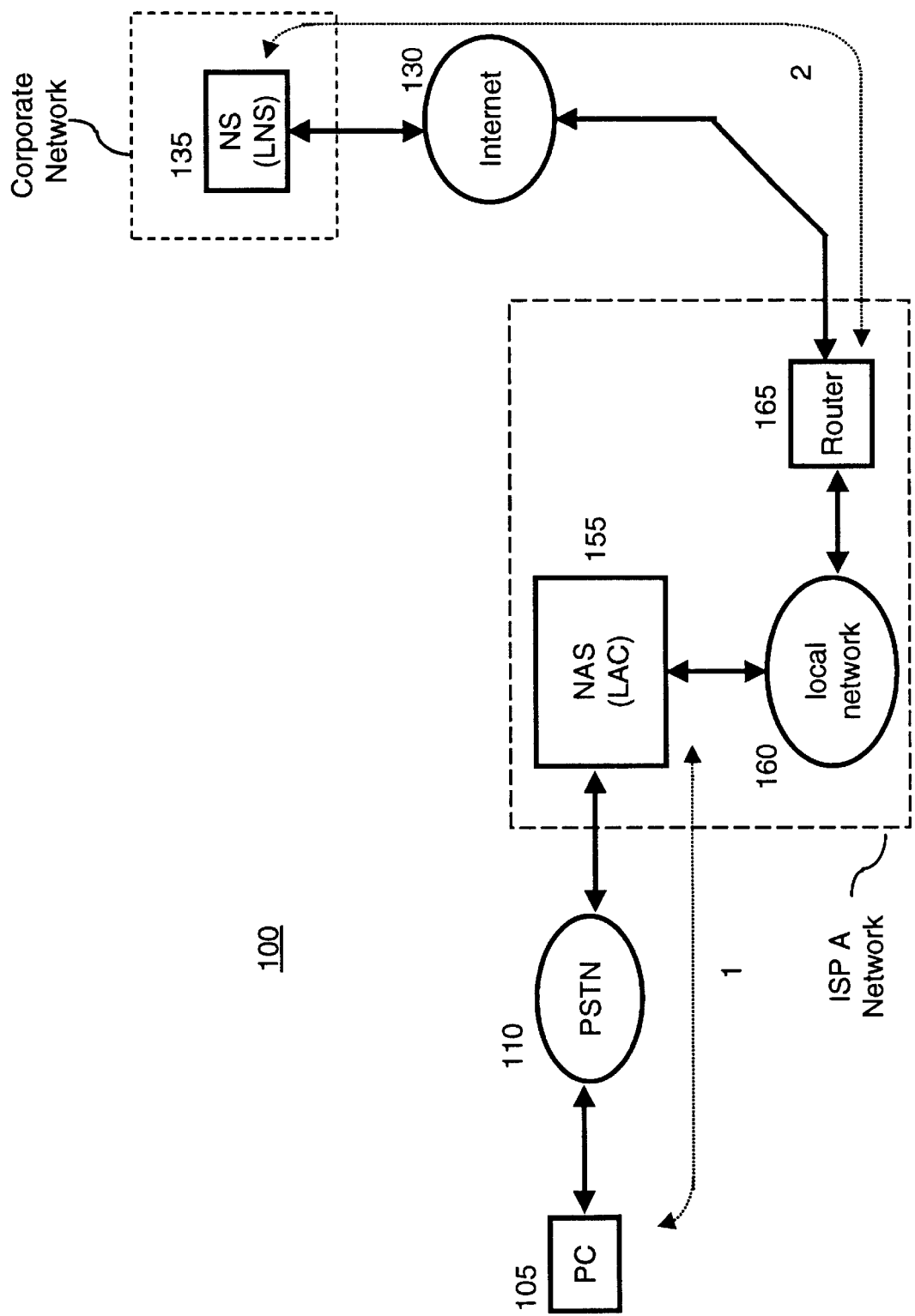
FIG. 2 shows a communications system in accordance with the principles of the invention.

Turning now to FIG. 2, the latter shows an illustrative communications system 100 in accordance with the principles of the invention. Other than the inventive concept, the elements are well-known and will not be described in detail. For example, personal computer (PC) 105 includes data communications equipment (not shown) for dial-up access through public-switched-network (PSTN) 110 to ISP A for establishing an Internet connection. Likewise, the solid lines between elements of communications system 100 are representative of well-known communications facilities between the respective endpoints, e.g., the connection between PC 105 and PSTN 110 is representative of a local loop connection, the connection between ISP A and Internet 130 is supported by asynchronous transfer mode (ATM) over a synchronous optical network (SONET), etc. Further, its assumed that the reader is familiar with the above-mentioned L2TP protocol, Expedited Forwarding Service, Assured Forwarding Service, and the *PPP Multilink Protocol* (*MP*) along with its multi-class extension (hereafter referred to as the MP protocol).

At this point, the following definitions are assumed:

mL2TP—the L2TP protocol as defined in K. Hamzeh, T. Kolar, M.

Littlewood, G. Singh Pall, J. Taarud, A. J. Valencia, W. Verthein; *Layer Two Tunneling Protocol "L2TP"*; Internet draft, March, 1998; plus modifications as described herein;.

LAC—mL2TP Access Control, i.e., a Network Access Server (NAS) that supports mL2TP; and LNS—a Network Server (NS) that supports mL2TP;

(These definitions are used to simplify an illustrative description of the inventive concept. As such, and as those in the art will realize, the inventive concept is not so limited and can be applied to any tunneling protocol and associated processing equipment.)

As can be observed from FIG. 2, communications system 100 comprises ISP A, as represented by ISP A Network. The latter comprises LAC 155 (also referred to as a "serving LAC"), which includes a point-of-presence (POP) router (not shown) as known in the art, a local network 160, and a router 165. It is assumed that ISP A provides a VPN service for remotely located employees to access an illustrative corporate network via LNS 135, which provides, among other functions, a routing and firewall capability. (The corporate network is assumed to be, e.g., a collection of local area networks (not shown) suitably protected behind LNS 135.) The VPN service, e.g., for a user associated with PC 105, is represented by dotted lines 1 and 2, via the ISP A Network. At this point, the connectivity is a point-to-point MP session whose endpoints are the remote user's networking application on one end (as represented by PC 110) and the termination of this connectivity into LNS 135 on the other. (It should be noted that accounting, if necessary, can be performed at the Serving LAC, as well as the LNS, i.e., each element may count packets, octets and connection start and stop times.)

For the purposes of this description, it is assumed that a tunnel (for supporting the VPN service) has already been set up, or negotiated, between the serving LAC and the LNS using either known L2TP techniques or the method described in the above-referenced U.S. patent application of Chuah, entitled "Providing Quality of Service in Layer Two Tunneling Protocol Networks." Further, it is assumed that the user desires access to the VPN service and has been authenticated. (For example, for secure conduits, the ETF has defined two protocols for security—the Password Authentication Protocol (PAP) and the Challenge-Handshake Authentication Protocol (CHAP) (e.g., see IETF Request for Comment (RFC) 1334, *"PPP Authentication Protocols"*). Obviously, if LAC 155 can not authenticate the user, the connection is not accepted. In the context of this invention, it is presumed that the connection between the user and the serving LAC supports the MP protocol and is similarly authenticated.)

For an individual session, or call, the LAC (or LNS) receives requests for setting up an incoming call from a user (or an outgoing call to a user). In accordance with the inventive concept, each individual session can request multiples QoS classes. The LAC (or LNS) determines the relevant traffic parameters and QoS (codepoints) (described below) based on the user's a priori defined profile or as defined in the received MP messages. (In the former case, the LAC (or LNS) communicates with a respective Authentication Authorization and Accounting (AAA) server, as known in the art, to obtain user profiles based on, e.g., user login name. However, for the remainder of this description, the inventive concept is described in the context of an incoming call to LAC 155 using MP.)

In support of the above-described virtual dial up service, and in accordance with the inventive concept, a form of the L2TP (mL2TP) protocol is used. As in L2TP, there are two parallel components of mL2TP operating over a given tunnel: control messages between each LAC-LNS pair, and payload packets between the same LAC-LNS pair. The latter are used to transport mL2TP encapsulated MN packets for user data sessions between the LAC-LNS pair. As in L2TP, the Nr (Next Received) and Ns (Next Sent) fields are always present in control messages and are optionally present in payload packets. The control messages and payload messages use different sequence number sets. For the above-mentioned LAC-LNS pair scenario, there are no changes to the L2TP draft protocol definition as far as the maintenance and usage of (Nr, Ns) is concerned.

As noted above, before the call is established, mL2TP control messages are exchanged between the Serving LAC and the LNS. Therefore, new Attribute Value Pairs (AVP)s (described below) are defined for use in the L2TP control messages (hence becoming mL2TP control messages) for enabling two mL2TP peers to set up, or negotiate, a call having multiple classes of service. As such, it should be realized that—other than the additional QoS negotiation for establishing such a call—L2TP tunnel set up procedures are unchanged.

Figure 3:
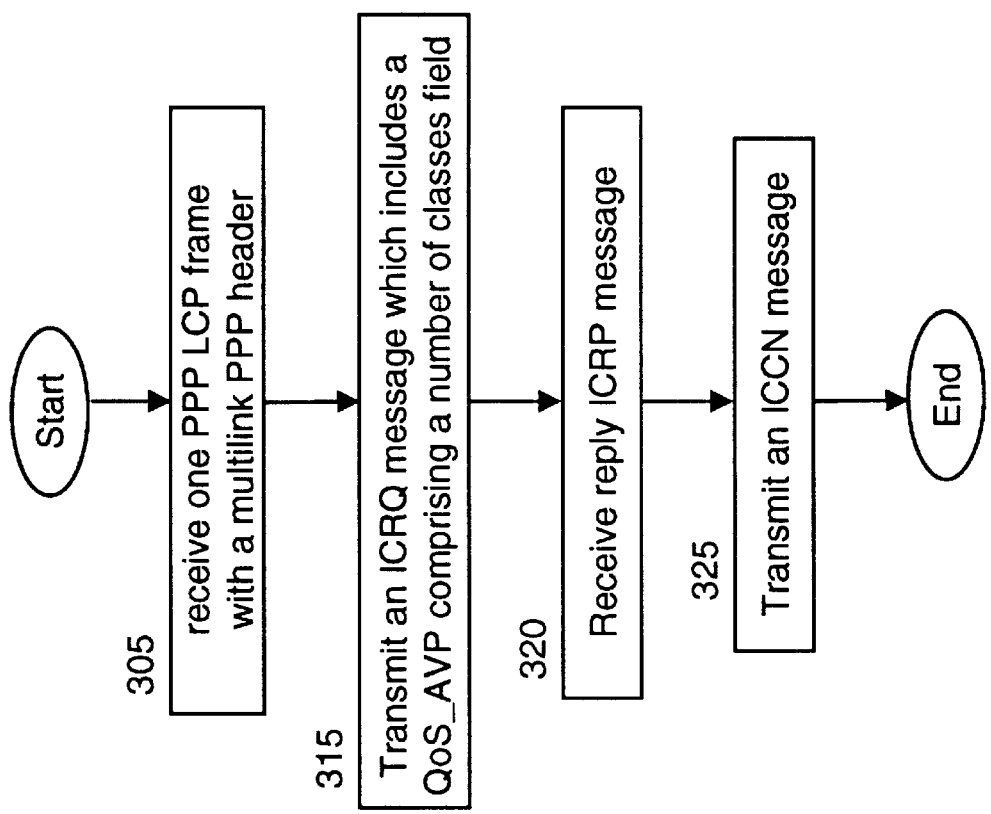
FIG. 3 shows a flow chart of an illustrative method for use in the communications system of FIG. 2.
Figure 4:
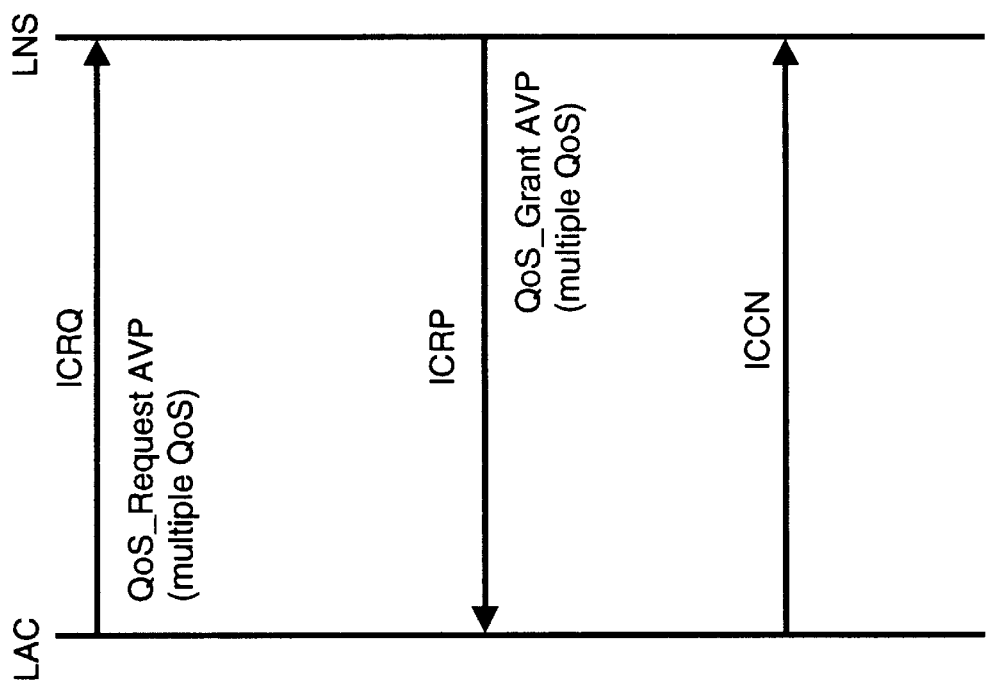
FIG. 4 illustrates a control message transaction for negotiating a call in accordance with the principles of the invention.
Figure 14:
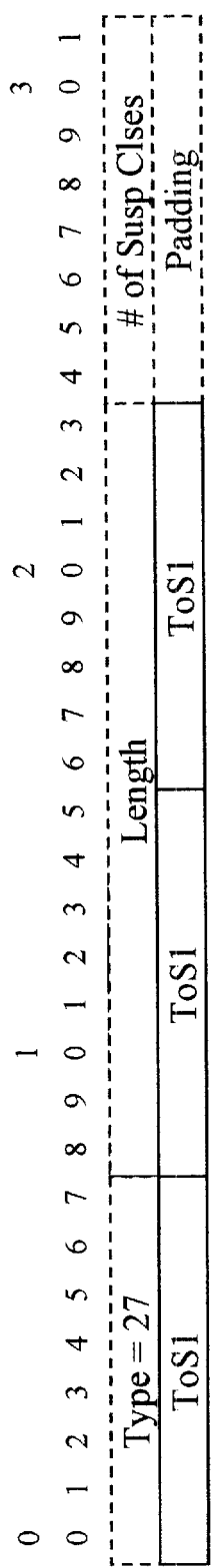
FIG. 14 shows a portion of a modified multilink header.

Reference should now be made to FIG. 3, which shows an illustrative high-level flow chart of a method in accordance with the principles of the invention for negotiating multiple QoS within a single call. (It is presumed that LAC 155 and the other respective servers are suitably programmed to carry out the below-described methods using conventional programming techniques, which, as such, will not be described herein.) In step 305 of FIG. 3, the serving LAC receives one PPP LCP frame with a multilink header from the user. Upon identification of the multilink header, the serving LAC (e.g., LAC 155), examines the "# Susp Clses" field of the multilink header. In particular, the serving LAC checks the value of the "# of Susp Clses" field and the associated values of the ToS values within the modified multilink header and creates an appropriate QoS_Request AVP for attachment to an ICRQ message (described below). (As known in the art, the "# Susp Clses" field is currently available in a multilink header. Therefore, and, in accordance with the inventive concept, a multilink header is modified as shown in FIG. 14 to convey additional QoS information (in FIG. 14, illustratively 3-ToS). In step 315, the serving LAC transmits the ICRQ message with the QoS_Request AVP. In accordance with the inventive concept, the QoS_Request AVP specifies how many QoS classes are associated with this call and the types of QoS (described further below). The serving LAC, in step 320, receives a reply with a QoS_Reply AVP in the received ICRP message. The serving LAC then responds with an Incoming-Call-Connected (ICCN) message in step 325. A corresponding illustrative control message transaction for performing the above-described negotiation is shown in FIG. 4 between two mL2TP peers (here represented by a LAC and an LNS).

Figure 5:
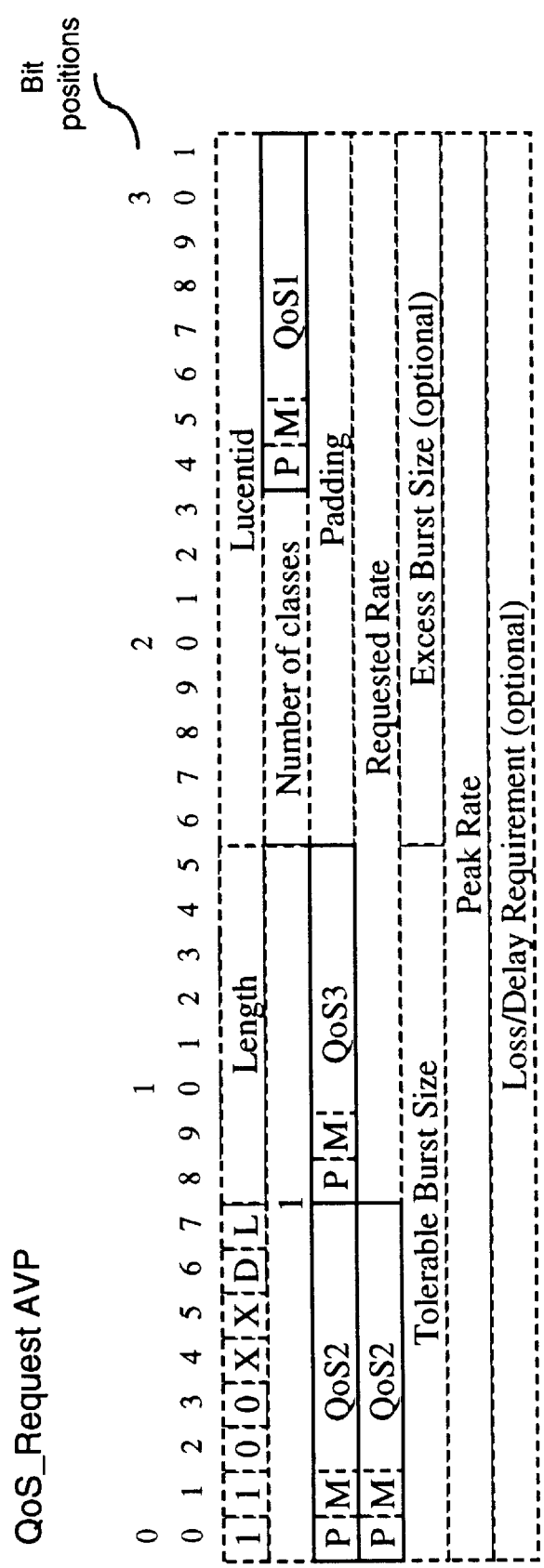
FIGS. 5–6 illustrate new Attribute Value Pair L2TP messages for use in accordance with the principles of the invention.

Turning to FIG. 5, an illustrative format of a QoS_Request AVP is shown. The first four bits of this AVP have a predefined bit pattern of "1100" (as defined L2TP), bit positions 4 and 5 are "don't cares," and bit positions 6 and 7 convey two new parameters, D, and L, where D is representative of a delay class bit, and L is representative of a Loss class. The D bit is used if the underlying tunnel supports delay classes only. In other words, if the D bit is set in an ICRQ message, only the delay bits of the differentiated code point value are taken into consideration (described below). Similarly, the L bit is used if the underlying tunnel supports loss classes only, i.e., if the L bit is set only the loss bits of the code point are taken into consideration.

Following the D and L bits is a eight bit length field, the value for which is the size of this AVP. After the length field, there is a two byte Vendor specific ID (here illustratively shown as conveying the data representative of a Lucent identifier (Lucentid) and also denoting that this is a call message having multiple QoS). (Alternatively, this could be replaced by a predefined mL2TP AVP code signifying that this is a call message having multiple QoS.) The Vendor specific ID is followed by a two byte L2TP attribute type field, here set to 1. After the attribute field there is a "number of classes" field that specifies the number of QoS being requested. In this example, the number of classes field is equal to the number of different classes determined in step and 305 of FIG. 3.

Following the number of classes field, there are as many differentiated services code point values (QoS identifiers that are one byte in length) as are specified by the value of the number of classes field. (For the QoS_Request AVP of FIG. 5, the value of the number of classes field is illustratively three.) Each QoS specifies a particular class of differentiated service for an associated PPP class extension. In addition, the first two bits of each QoS bytes are representative of a promotable bit, P, and a demotable bit, M. In other words, the P and M bits are used on a per-class basis. When the P and M bits represent a zero value, the mL2TP peer is indicating that only the chosen differentiated code point value is to be used on IP packets within the session's data channel for that class. When the P bit is set, it means that the mL2TP peer can recommend a differentiated service code point value with a higher level of service if the requested one is not available for a class. When the M bit is set, it means that the mL2TP peer can recommend a differentiated service code point value with a lower level of service should the requested one not be available for a class. Following the multiple QoS fields, a "padding" field is used to fill the AVP message, if necessary.

The values of the differentiated service code point values are defined in a fashion similar to the definition of code-points in the above-mentioned Assured Forwarding (AF) Service. In particular, the two mL2TP peers may set up classes $A_{ij}$ with a call, where i represents a type of delay class and j represents a type of loss class. For the purposes of example only, i=1, 2, 3, 4, and j=1, 2, 3. As such, there are 4 classes for a call each class supporting a different delay priority class, i.e., with differentiated service code points Aix, i=1, 2, 3, 4, as shown in the table, below.

| Delay Priority Classes | |
|---|---|
| Aix | Differentiated Service Code Point Value |
| A1x | 001XXX |
| A2x | 010XXX |
| A3x | 011XXX |
| A4x | 100XXX |

The "X" represents a "don't care" condition, i.e., the value can be a binary zero or a binary one. Individual sessions with differentiated service code points Aij are mapped to a tunnel supporting differentiated service code point Aix.

Similarly, the mL2TP peers may set up a call supporting different loss priority classes, i.e., with differentiated service code points Axj, j=1, 2, 3, as shown in the table, below.

| | Loss Priority Classes |
|---|---|
| Aix | Differentiated Service Code Point Value |
| Ax1 | XXX010 |
| Ax2 | XXX100 |
| Ax3 | XXX110 |

Thus, for AF services, differentiated service code point values such as 001xxx or xxx010 are acceptable for the various classes. (For proper traffic engineering, it is required that the two mL2TP peers specify a rate for each tunnel that supports AF services. With such specification, the L2TP peers can decide when to admit/reject data sessions. They can also decide how to share the available resources (bandwidth and buffers) among the different established tunnels. Similarly, for the earlier-mentioned Expedited Forwarding (EF) service, the QoS_Request AVP includes the EF Code Point (i.e., the differentiated service code point value), and the requested average rate.)

The presence of a QoS_Request AVP in the ICRQ or OCRQ indicates that one mL2TP peer wishes to use several differentiated service code points for all data packets of a particular PPP call. If the mL2TP peer cannot accept any code point due to a shortage of resources, that mL2TP peer can recommend an alternative code point if the above-mentioned Promotable/Demotable bits are set. Otherwise, the mL2TP peer rejects the call request. Thus, the value found in the QoS_Grant AVP (described below) indicates the value that the mL2TP peer is willing to accept.

In addition, the QoS Request AVP contains other parameters that allow further specification of traffic parameters for a particular class. In FIG. 5, only QoS2 is shown as specifying additional parameters. The requested rate field, tolerable burst size field, optional excess burst size field, peak rate field and optional loss/delay requirement field represent traffic parameters that are used to provide a class within a call with quantitative delay/loss guarantees as well as improve call admission probability (increase bandwidth multiplexing). In particular, the requested rate field value represents the requested average bits per second for that class. The tolerable burst size field value request represents how long a transmitter may transmit packets at the peak rate. The excess burst size field value request represents how long a transmitter can exceed the tolerable burst size. The peak field value request represents the requested peak rate, e.g., in bits per second. The loss/delay requirement field value request represents either packet loss (above-mentioned L bit field is set) or delay class (above-mentioned D bit field is set). For packet loss, this value represents the percentage of tolerable packet loss, e.g., 1%, 5%, etc. For delay class, this value represents the tolerable delay, e.g., in milli-seconds.

Figure 6:
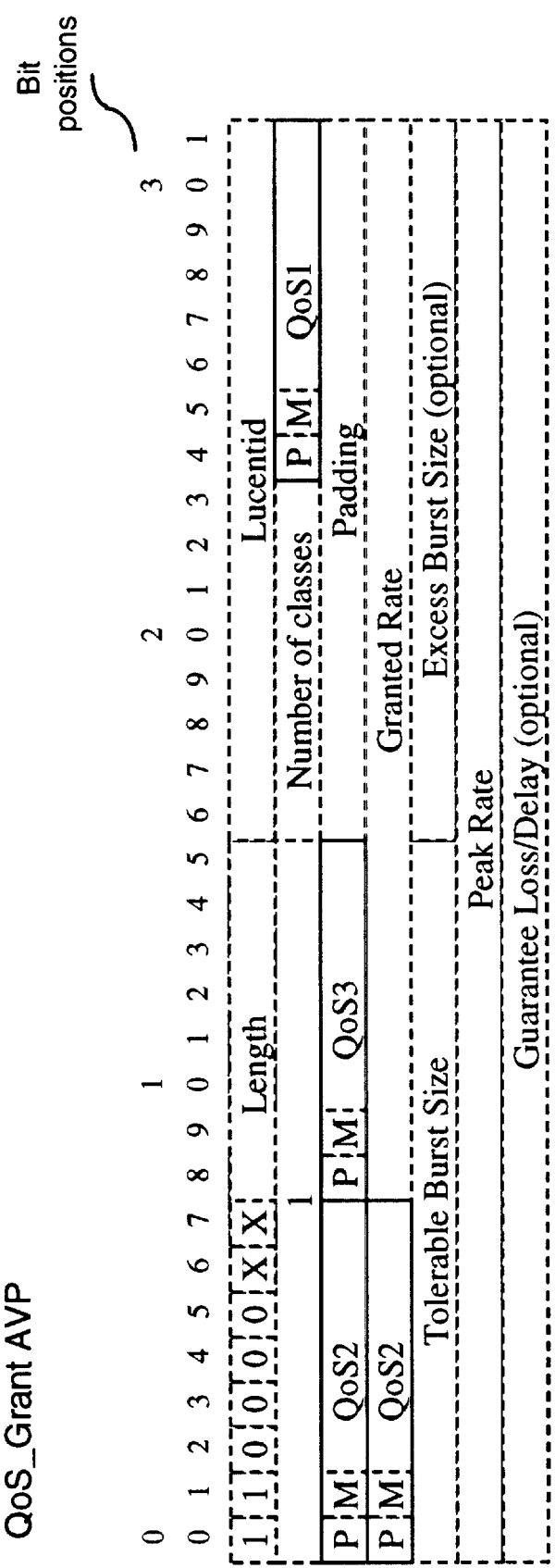

FIG. 6 shows an illustrative format for a QoS_Grant AVP sent by a tunnel terminator (e.g., LNS 135 of FIG. 2) in the ICRP message. The fields of the QoS Grant AVP are complementary to those of the QoS_Request AVP (described above). In this case, there are no D or L bits, and the responding server indicates the "Granted Rate" and the Guarantee Loss/Delay value (optional) in the indicated fields. The granted rate may be smaller than the requested rate. (At this point, it should be noted that if multiple QoS need to be negotiated in the reverse direction, then the LNS will also attach a QoS Request AVP in accordance with the inventive concept to the ICRP message (not shown). In this case, the ICCN reply from the LAC carries the QoS Reply AVP to the LNS request.)

Figure 7:
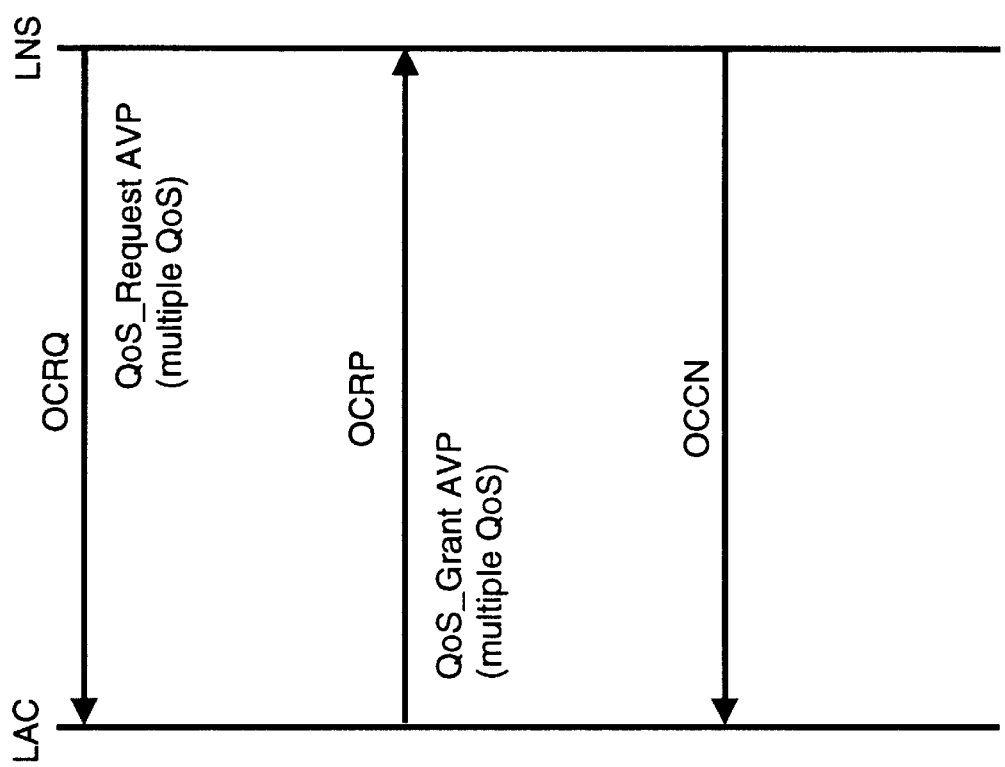
FIG. 7 illustrates another control message transaction for negotiating a call in accordance with the principles of the invention.

A corresponding illustrative control message transaction for performing the above-described negotiation is shown in FIG. 7 between two mL2TP peers (here represented by a LAC and an LNS) when the LNS is providing the call request. In this instance, the corresponding Outgoing-Call-Request (OCRQ), Outgoing-Call-Reply (OCRP) and Outgoing-Call-Connected (OCCN) messages are suitably modified as described above.

Figure 8:
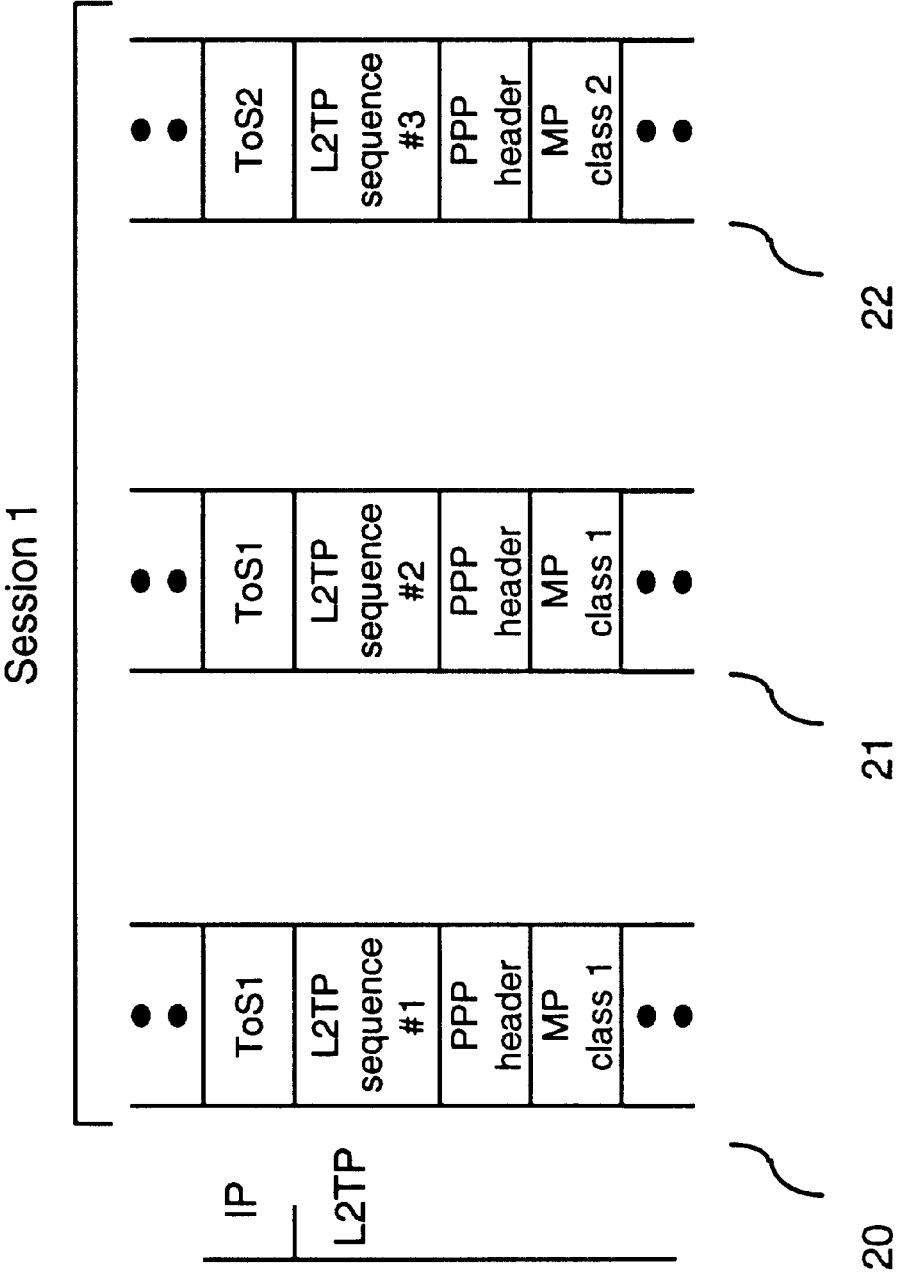
FIG. 8 shows portions of L2TP packets with encapsulated MP packets in accordance with the principles of the invention.

As can be observed from the above, a flexible quality of service extension to L2TP to support multi-class extension to multilink PPP has been described. As a result, only one sequence number set need be used for payload messages notwithstanding the payloads represent different classes of service. This is illustrated in FIG. 8. Only one session is established. L2TP packet 20 has a defined quality-of-service field as represented by ToS1. This field is followed by an L2TP sequence number field, illustratively set to 1. L2TP packet 21, which conveys the next class 1 packet, uses the same sequence number set as L2TP packet 20 and the value for this field is simply the next number in the sequence, i.e., 2. However, and in accordance with the inventive concept, when a different class of PPP data is encountered, the same sequence numbering space, or sequence number set, is used. This is illustrated by L2TP packet 22, which conveys PPP data having an MP class 2 and using the next number in the sequence, i.e., 3.

Figure 9:
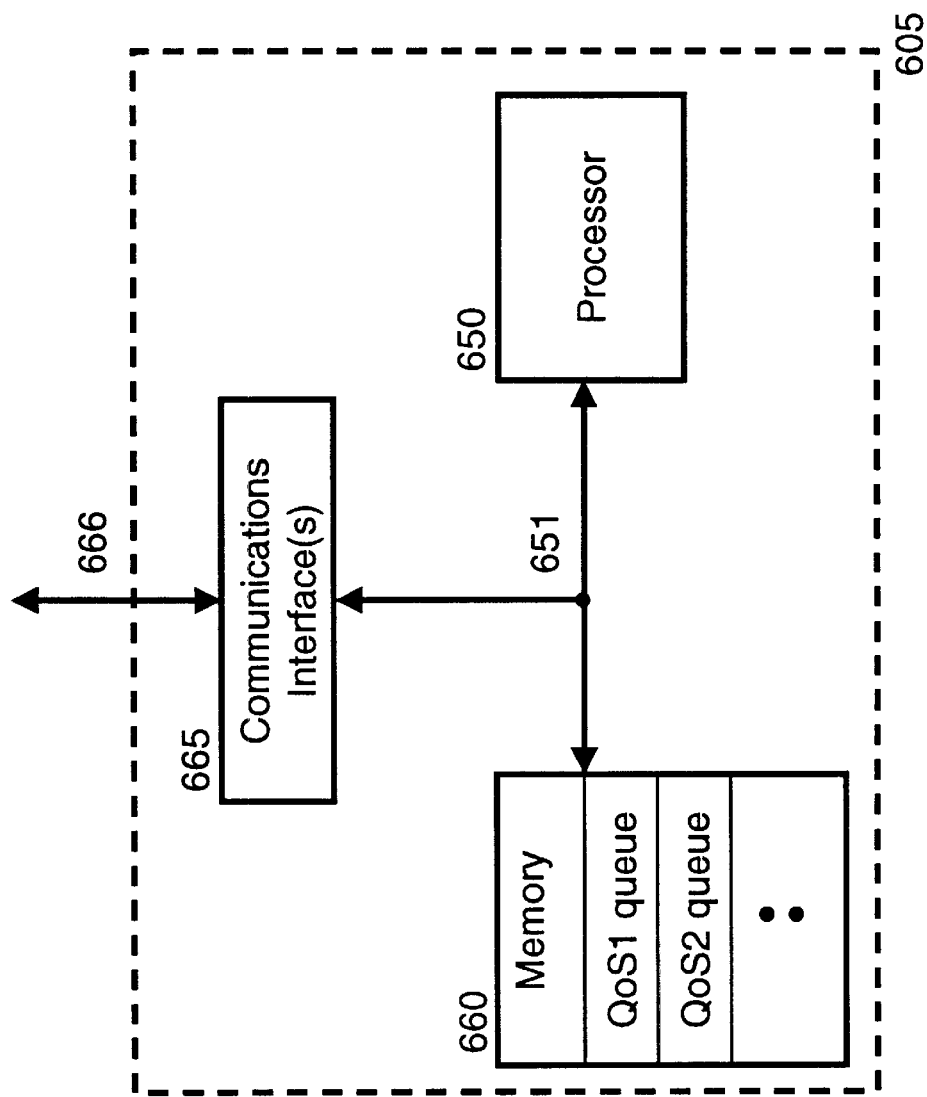
FIG. 9 shows an illustrative high-level block diagram of a packet server.

Turning briefly to FIG. 9, a high-level block diagram of a representative NAS (L2TP peer), or packet server, is shown in accordance with the principles of the invention. A packet server is a stored-program-control based processor architecture and includes processor 650, memory 660 (for storing program instructions and data, e.g., for communicating the above-mentioned new AVP messages related to QoS, etc.) and communications interface(s) 665 for coupling to one or more communication facilities as represented by path 666. It should be noted that each LAC maintains as many priority queues per-call, or per-session, as specified in the ICRQ QoS Request AVP. (Buffers of other sessions are not shown.) In accordance with the invention, only one sequence number set is used per-call for the bearer data channel. Packets for each queue can be served using a strict priority scheduling algorithm or weighted fair-queuing type of scheduling algorithms. The different queues are illustrated in FIG. 9 by QoS1 queue and QoS2 queue of memory 660.

As such, differentiated services can be offered by ISPs within a call. For example, assume that ISP A of FIG. 2 offers three data services: gold (for voice-over-IP), silver (for urgent data), and bronze (for regular data). Each user can subscribe to any of the three data services. In addition, each user can specify whether that user wants internet or corporate network access or mixed services. Further, the user can specify a certain bandwidth the user wishes to use for a particular data service e.g., gold at 8 Kbps, silver at 56 Kbps via, e.g., their a priori stored profile (not shown).

Figure 10:
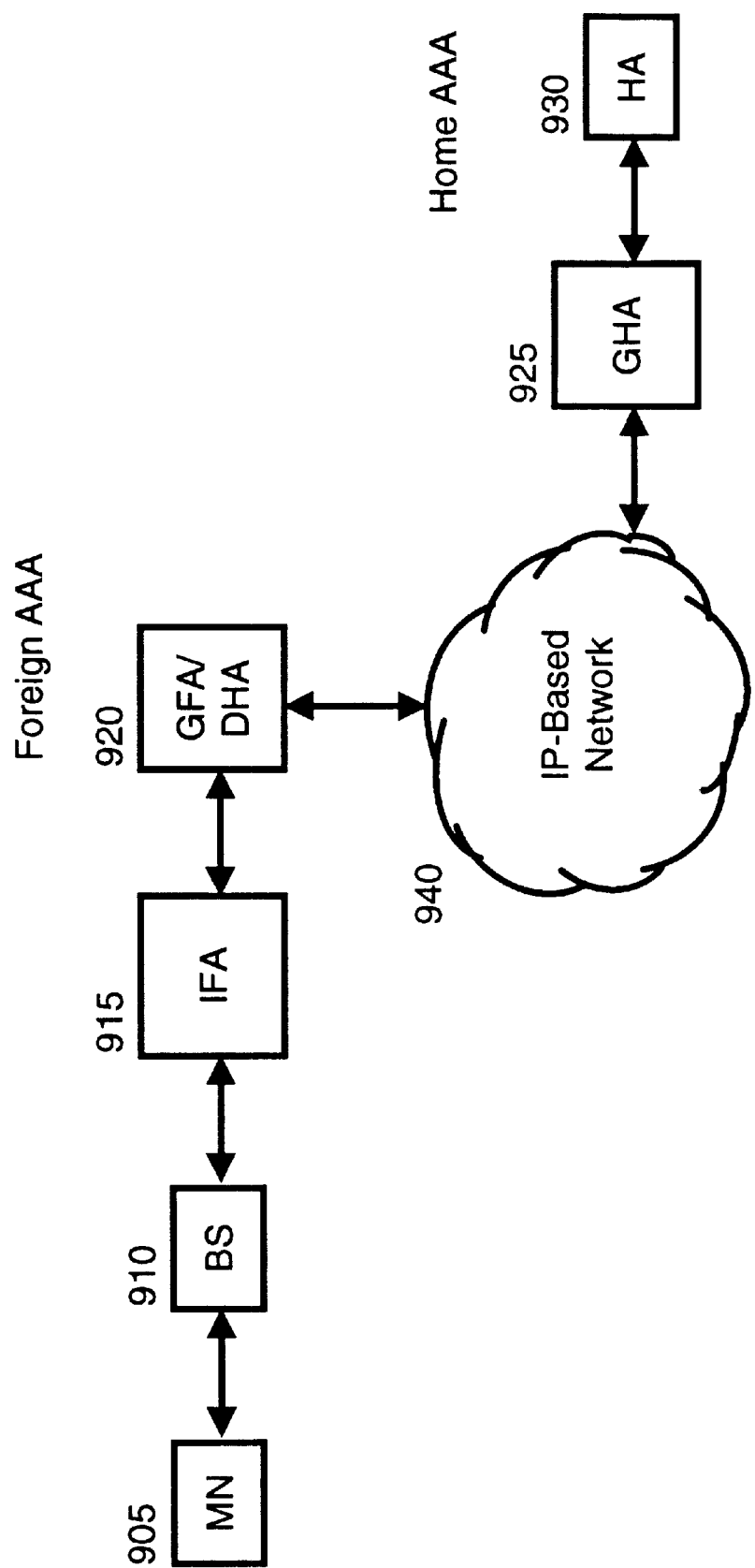
FIG. 10 shows another communications system in accordance with the principles of the invention.

It should be noted that the inventive concept is also applicable to providing Guaranteed/Differentiated Services in other networks. As an example, an illustrative wide area wireless data network in accordance with the principles of the invention is shown in FIG. 10. Other than the inventive concept, the elements are well-known and will not be described in detail. For example, the mobile endpoint, or mobile node (MN), is represented by MN 905. The latter is coupled to base station (BS) 910. For the purposes of this example, it is assumed that the BS 910 is a part of a "foreign area" served by intermediate foreign agent (IFA) 915, which includes a policy server (not shown). IFA 915 is coupled to gateway foreign agent/dynamic home agent (GFA/DHA) 920. Similarly, the user (not shown) of MN 905 is associated with a "home area." The latter is represented by gateway home agent (GHA) 925 and home agent (HA) 930. It is assumed that well-known user authentication methods are used, e.g., via Authentication, Authorization, Accounting (AAA) Servers (not shown). In this context, BS 910, IFA 915, GFA 920, GHA 925 and HA 930 are all different forms of packet servers. Communications between, e.g., GFA/HFA 920 and GHA 925, is via IP-based network 940.

Except as modified by the inventive concept, the communications system of FIG. 10 uses the Mobile IP protocol, which is designed to allow a mobile node to have connectivity on the move (e.g., see C. Perkins et al., "*IP mobility support*," RFC2002, October 1996). As such, only that part of the Mobile IP protocol as modified by the inventive concept is described herein.

In Mobile IP, MN 905 registers with BS 910 via link-layer messaging (not shown). In particular, MN 905 transmits a Registration Request message to BS 910, which uses link-layer signaling to communicate the request to IFA 915. Then, IFA 915 relays the mobile IP Registration Request message to a GFA 920, after modifying relevant fields. Subsequently, a "compound tunnel" is then set up between the home agent (e.g., HA 930) and the foreign agent (e.g., IFA 915), on behalf of the mobile node (e.g., MN 905) (e.g., see S. Blake et al., "*An architecture for differentiated services*," RFC2475 December 1998). (It should be noted that if network-layer signaling is used, the compound tunnel is from BS 910 to HA 930. In either case, the inventive concept equally applies.)

Although some proposals have been made to provide QoS in Mobile IP, currently, traffic from a mobile node is carried as best effort traffic in the Mobile IP tunnel as IP-in-IP. (An example of such a QoS proposal can be found in "IP encapsulation in IP," by C. Perkins, RFC2003, October 1996, which proposes a framework for providing quality of service based on a 6 bit code point present in the TOS byte. Also, the above-mentioned article by Blake et al. describes marking the TOS byte of the outer IP header with the same value as that present in the inner IP header.)

However, and in accordance with the inventive concept, a new QoS_Request extension is included in this Mobile IP Registration Request message. This new QoS_Request extension allows a user to request multiple QoS within the same session. In addition, the approach also allows different segments of a compound tunnel to enjoy different by related QoS. (For the purposes of this description it is assumed that only the end points of each segment are responsible for the QoS that they agree to guarantee.) In accordance with the invention, when MN 905 first registers with BS 910, MN 905 attaches a QoS_Request extension in its Registration Request message (referred to herein as a modified Registration Request message). This QoS_Request extension allows a user to request as many classes of QoS for its connection as it deems necessary. At each level, the corresponding mobility agent (e.g., BA, IFA etc.) may modify this QoS_Request extension if it cannot provide sufficient resources to grant the requested QoS. For example, GFA 920 decides (based on available resources and the user's request) whether to admit the user or not. If the user's request is accepted, i.e., the user is admitted, GFA 920 forwards the modified Registration Request message to GHA 925. (GFA 920 can also choose a new but related code point (based on the ability to "promote" or "demote" the service) if the network of FIG. 10 is currently experiencing congestion for the segment between GFA 920 and GHA 925.) When GFA 920 receives a positive reply from GHA 925, GFA 920 stores this information in its local policy server (not shown) or its associated AAA server (not shown). GFA 920 then attaches the granted QoS_extension to the lower-level mobility agents. Lower-level mobility agents may store the QoS information in their local policy server (not shown). (It should be noted that such storage may be as simple as storing the information as an entry in a cached registration table.)

Figure 11:
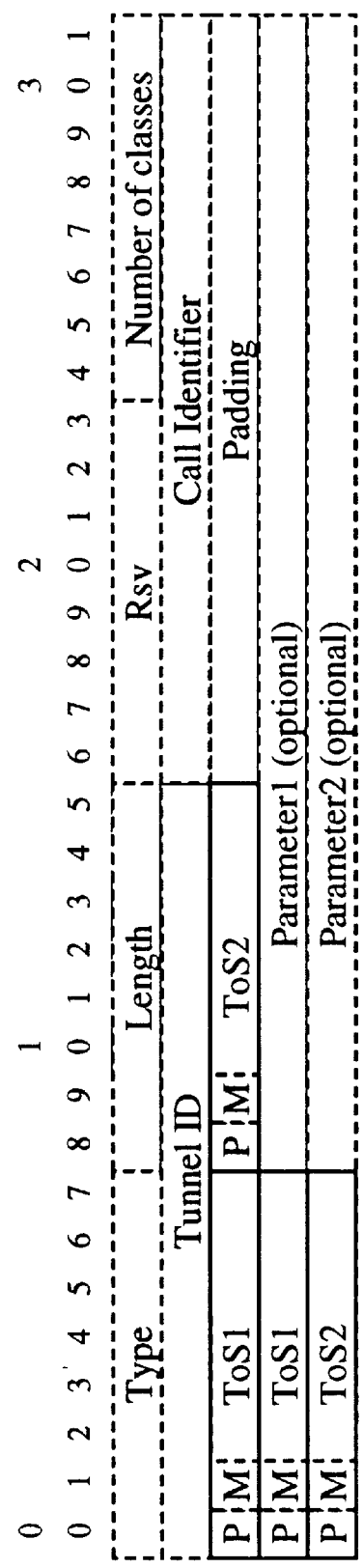
FIGS. 11–12 illustrate other QoS-type messages for use in accordance with the principles of the invention.
Figure 12:
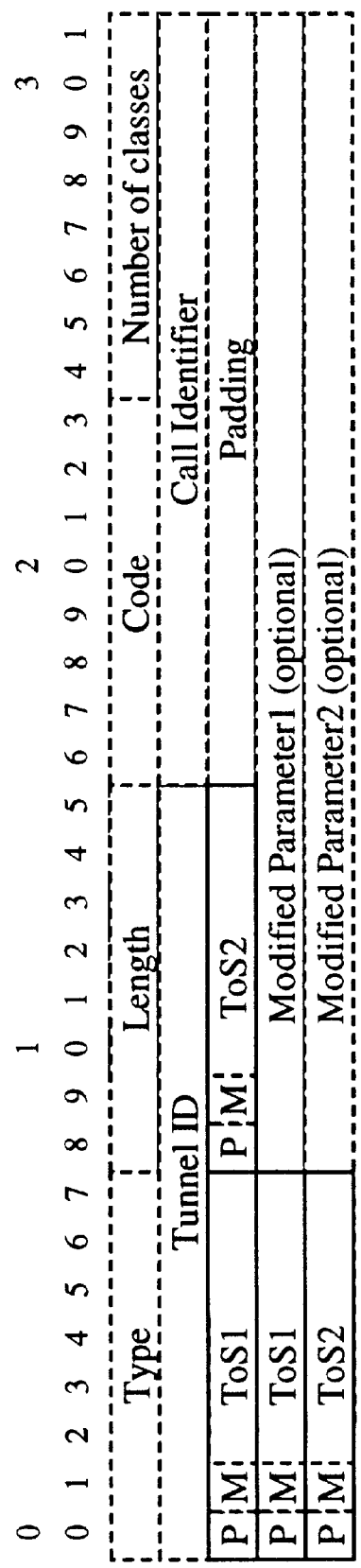

The QoS_Request extension thus allows specification of differentiated service (DS) code points (or classes of DS code points) that MN 905 desires, and some optional traffic parameters for a single call. Illustrative formats for the QoS_Request extension and QoS_Request reply are shown in FIGS. 11 and 12 for use in the Registration Request message and Reply message of Mobile IP. Note that the tunnel and call identifiers can be in the QoS_Request extension and/or in the QoS_Reply extension. Those identifiers are later used for bearer data in a GRE (generic routing and encapsulation) tunnel. Bearer data for a particular QoS class will use the appropriate ToS codepoint in the IP ToS byte. In a similar fashion to the AVP messages shown in FIGS. 5 and 6, the QoS_Request extension and the QoS_Reply extension include a "number of classes" field. Each requested class is expressed in a corresponding ToS byte (e.g., ToS1, ToS2, etc.) Each ToS byte includes P and M bits. Optional Traffic parameters for each class are also shown (as such, the number of classes field also specifies the number of optional parameters included in the message). (However, these optional traffic parameters can be alternatively stored as part of the user profile in an AAA server (not shown).) The presence of optional traffic parameters allow more flexibility in terms of services that can be sold to customers as well as smarter admission control algorithms that provide better bandwidth multiplexing gain. In the QoS_Reply extension, the code field is used to indicate whether the QoS_Request is granted or rejected.

Figure 13:
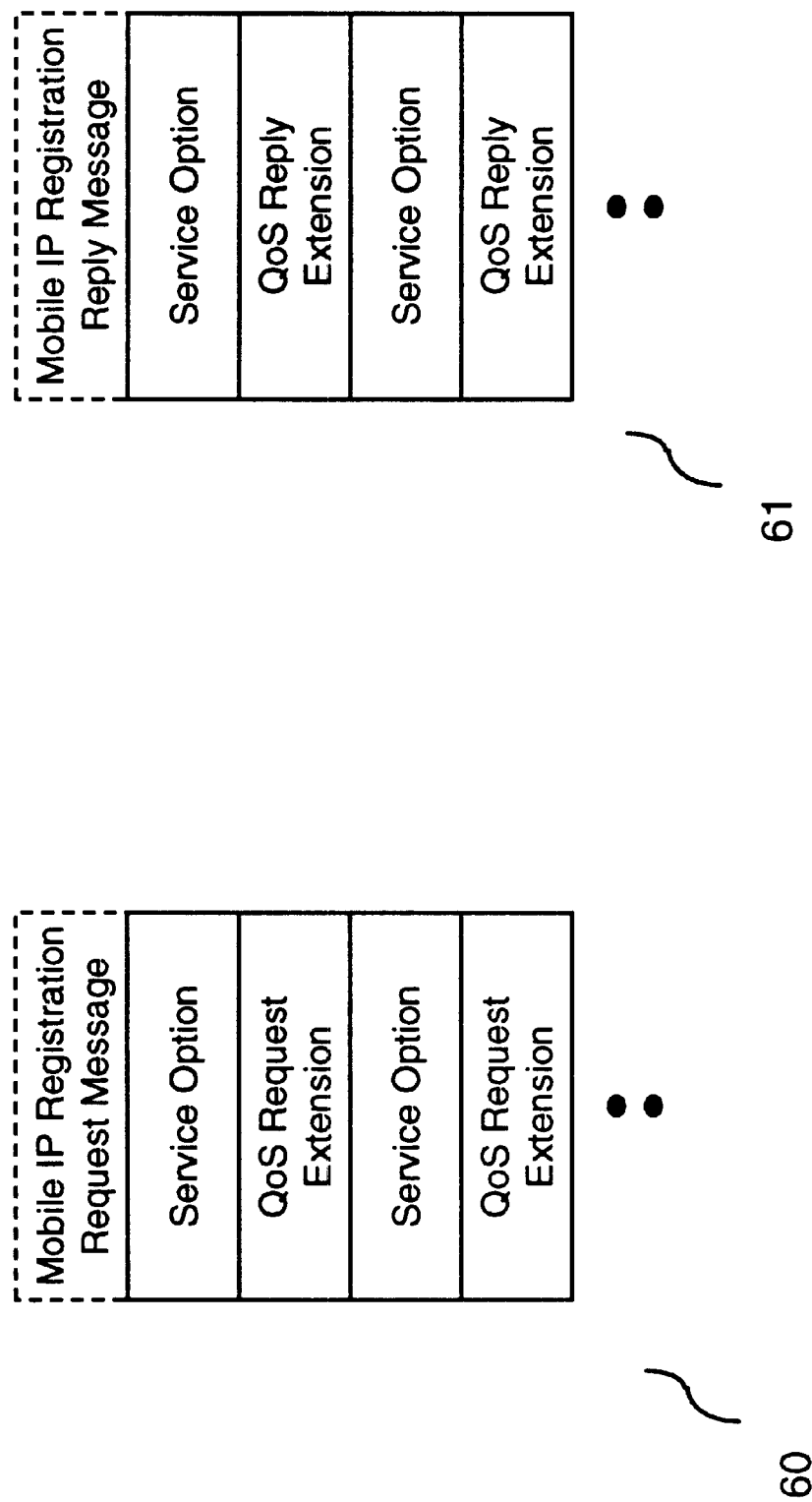
FIG. 13 shows portions of Mobile IP packets conveying Registration and Reply messages in accordance with the principles of the invention.

Another modification to Mobile IP Registration and Reply messages is shown in FIG. 13. Mobile IP Registration message 60 comprises additional "service option" fields, each with an associated QoS. The "service option" field conveys a request for the type of service, e.g., Internet access, VPN, mixed (e.g., both Internet and VPN). Similarly, there is a corresponding Mobile IP Registration Reply message as indicated by Mobile IP Registration Reply message 61.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was described in the context of a Servicing LAC tunneling to an LNS, the inventive concept is applicable to multi-hop tunnels, e.g., such as described in the co-pending and commonly assigned U.S. patent application of Chuah et al., entitled "A Multi-Hop Point-to-Point Protocol," Ser. No. 09/074745, filed on May 5, 1998, now U.S. Pat. No. 6,449,272.

What is claimed:

1. A method for use in a virtual private network (VPN) for establishing multiple quality of service (QoS) classes using a Layer Two Tunnel Protocol (L2TP) for a call between a first packet server and a second packet server, the method comprising the steps of:

determining that the call needs to be established directly between the first packet server and the second packet server using a packet tunnel; and establishing the call through the packet tunnel by first negotiating multiple QoS classes for the call by sending, to the second packet server, a QoS request message comprising a number of classes field whose value represents the number of classes of service requested in the QoS request message and receiving, from the second packet server, a QoS grant message that includes granted classes of service information.

2. The method of claim 1 wherein each different class of quality-of-service (QoS) corresponds to an associated point-to-point protocol multi-class extension for the call.

3. The method of claim 1 wherein the QoS request message further comprises parameters that include a promotable bit that enables the second packet server to recommend a higher class of service for a class than the requested class of service.

4. The method of claim 1 wherein the QoS request message further comprises parameters that include a demotable bit that enables the second packet server to recommend a lower class of service for a class than the requested class of service.

5. The method of claim 1 wherein the QoS request message further comprises parameters including a requested rate field, a tolerable burst size field, an excess burst field, and a peak rate field.

6. The method of claim 1 wherein the QoS request message is a part of a Layer Two Tunneling Protocol (L2TP) Incoming Call Request (ICRQ) message.

7. The method of claim 1 wherein the QoS request message is a part of a Layer Two Tunneling Protocol (L2TP) Outgoing Call Request (OCRQ) message.

8. The method of claim 1 wherein the QoS request message is a part of a Registration Request message used in a Mobile Internet Protocol.

9. The method of claim 1 wherein the QoS grant message include a granted rate field, a tolerable burst size field, an excess burst size field, and a peak rate field.

10. The method of claim 1 wherein the QoS grant message is a part of a Layer Two Tunneling Protocol (L2TP) Incoming Call Reply (ICRP) message.

11. The method of claim 1 wherein the QoS grant message is a part of a Registration Reply message used in a Mobile Internet Protocol.

12. The method of claim 1 wherein the first packet server communicates Internet Protocol (IP) packets, and the method further comprises the step of first establishing a multilink point-to-point protocol connection with a user associated with the call, wherein the multilink point-to-point protocol has multi-class extensions.

13. The method of claim 12 wherein the establishing step includes the step of sending, to the second packet server, a quality-of-service (QoS) request message comprising a number of classes field whose value is equal to the number of different classes of the multilink point-to-point protocol connection.

14. The method of claim 12 wherein the establishing step includes the step of sending, to the second packet server, a Layer Two Tunneling Protocol (L2TP) Attribute Value Pair message comprising a number of classes field whose value is equal to the number of different classes of the multilink point-to-point protocol connection.

15. The method of claim 1 further comprising the step of communicating data to the second packet server using sequence numbers taken from a set of sequence numbers such that data associated with different classes of service use the same set of sequence numbers.

16. The method of claim 1 further comprising the step of communicating data to the second packet server in packets using one data session for conveying data having associated multiple classes of service.

17. The method of claim 1 further comprising the steps of:

allocating a queue to each different class of QoS;

receiving packets which convey data that is associated with one of the classes of QoS; and storing the data in the queue allocated to that class of QoS.

18. A method for use in a Layer Two Transport Protocol (L2TP) access server (LAC) within a virtual private network for establishing multiple quality of service (QoS) classes for a call, the method comprising the steps of:

receiving a packet formatted in accordance with a point-to-point protocol with multi-class extensions, wherein the received packet includes a first number-of-classes field that comprises a value equal to the multiple QoS classes for the call from a user; and negotiating a call using a Layer Two Tunneling Protocol (L2TP) type message directly with a L2TP network server (LNS) by attaching a L2TP Attribute Value Pair message comprising a second number-of-classes field whose value is equal to the value of the first number-of-classes field to an L2TP control message and transmitting the L2TP control message to the LNS.

19. A method for use in a packet server for negotiating multiple quality of service (QoS) classes for a particular call within a same session, the method comprising the steps of:

attaching a quality-of-service request to a mobile internet protocol (IP) registration request; and transmitting the mobile IP registration request and the attached quality-of-service request to another packet server;

wherein the quality of service request comprises a number of classes field whose value is equal to the number of represented classes of service associated with the particular call in the same session in the mobile IP registration request.

20. The method of claim 19, wherein the quality-of-service request further comprises a number of quality-of-service fields equal to a value of the number of classes field.

21. A method for use in a packet server for negotiating multiple quality of service (QoS) classes for a particular call within a same session, the method comprising the steps of:

attaching a quality of service request to a mobile internet protocol (IP) registration request; and transmitting the mobile IP registration request and the attached quality-of-service request to another packet server;

wherein the quality of service request comprises a value specifying a number of QoS classes for the call and associated QoS service fields relating to each QoS class associated with the particular call during the same session.

* * * * *